(12) United States Patent
Odahara et al.

(10) Patent No.: US 7,041,903 B2
(45) Date of Patent: May 9, 2006

(54) CABLE MOUNTING MECHANISM

(75) Inventors: Jun Odahara, Yamanashi (JP);
Hiroyuki Sakagami, Yamanashi (JP);
Shintaro Mochizuki, Yamanashi (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/939,403

(22) Filed: Sep. 14, 2004

(65) Prior Publication Data

US 2005/0115730 A1    Jun. 2, 2005

(30) Foreign Application Priority Data

Oct. 31, 2003 (JP) .............................. 2003-372271

(51) Int. Cl.
*H02G 3/18* (2006.01)
(52) U.S. Cl. .................. 174/65 R; 174/60; 174/64; 174/135; 248/68.1
(58) Field of Classification Search ............. 174/65 R, 174/60, 64, 49, 135, 40 CC; 248/71, 68.1, 248/74.1, 74.3

See application file for complete search history.

(56) References Cited

U.S. PATENT DOCUMENTS

| | | | | |
|---|---|---|---|---|
| 3,954,238 A | * | 5/1976 | Nivet | .......................... 248/68.1 |
| 4,478,381 A | * | 10/1984 | Pittion et al. | .................. 248/71 |
| 2005/0039941 A1 | * | 2/2005 | Marroquin et al. | ............ 174/78 |

FOREIGN PATENT DOCUMENTS

| | | |
|---|---|---|
| JP | HEI. 2-96006 U | 7/1993 |
| JP | HEI. 2606098 U | 7/2000 |
| JP | 2003-041829 A | 2/2003 |

* cited by examiner

*Primary Examiner*—Dhiru R. Patel
(74) *Attorney, Agent, or Firm*—Sughrue Mion, PLLC

(57) ABSTRACT

A cable mounting mechanism includes a bracket having an opening, and a cable having a perimeter groove that is mounted on the opening in such a manner that a perimeter of the opening is pinched between both sidewalls of the perimeter groove. A clip is mounted for preventing the mounted cable from being moved in a perimeter direction.

4 Claims, 9 Drawing Sheets

CABLE MOUNTING MECHANISM

BACKGROUND OF THE INVENTION

1) Field of the Invention

The present invention relates to a cable mounting mechanism, and more particularly, to a cable mounting mechanism applied to a vehicle.

2) Description of the Related Art

In a conventionally-known technology regarding vehicles, an outside handle, an inside handle, and a sill knob are connected via cables to a door-lock device or the like disposed inside a door so as to transfer an operation of the outside handle, for example, to the door-lock device.

In a first cable mounting mechanism for mounting a cable on the door-lock device or the like, a perimeter groove is formed around the perimeter of a cable, while a bracket of the door-lock device or the like is formed with an opening having an opening end slightly narrower than the outer diameter of the perimeter groove of the cable and a bottom end having an inner diameter approximately equal to the outer diameter of the perimeter groove. When the cable is pushed through the opening end to engage its perimeter groove with the opening of the bracket, both sidewalls of the perimeter groove of the cable pinch the perimeter of the opening of the bracket. This first cable mounting mechanism is simple, and is achieved at low cost.

In a second cable mounting mechanism, the bracket is formed with a U-shaped opening having a bottom whose diameter is approximately equal to the outer diameter of the perimeter groove of the cable. On the other hand, a clip having an elastic bending portion for bonding a side surface of the bracket and the inner wall of the perimeter groove of the cable by pressure is inserted in the bracket, and then the perimeter groove of the cable is fitted in the opening of the bracket (see Japanese Utility-Model Application Laid-Open Publication No. 2-96006).

However, in the first cable mounting mechanism, when the cable is repeatedly inserted and removed due to failures in the door-lock device or the like, the outer shape of the perimeter groove of the cable is scratched, thereby making the cable prone to fall off from the opening of the bracket. Therefore, after the cable is removed, another new cable is required to be inserted.

In the second cable mounting mechanism, even if the cable is repeatedly inserted and removed, the outer shape of the perimeter groove of the cable is not scratched. Therefore, even after the cable is removed, another new cable is not required. However, the elastic bending portion of the clip will lose a desired crimping force, thereby leading to a drop-off of the cable. Therefore, a new clip is required to be inserted.

SUMMARY OF THE INVENTION

It is an object of the present invention to solve at least the above problems in the conventional technology.

A cable mounting mechanism according to one aspect of the present invention includes a bracket having an opening, and a cable having a perimeter groove that is mounted on the opening in such a manner that a perimeter of the opening is pinched between both sidewalls of the perimeter groove. A clip is mounted for preventing the mounted cable from being moved in a perimeter direction.

A cable mounting mechanism according to another aspect of the present invention includes a fixed portion fixed to a bracket, and a rotating portion rotatably mounted on the fixed portion. The fixed portion and the rotating unit cooperatively grip a cable.

The other objects, features, and advantages of the present invention are specifically set forth in or will become apparent from the following detailed description of the invention when read in conjunction with the accompanying drawings.

DETAILED DESCRIPTION

Exemplary embodiments of a cable mounting mechanism according to the present invention are described below in detail with reference to the accompanying drawings. The present invention is not limited to these embodiments.

Figure 1:
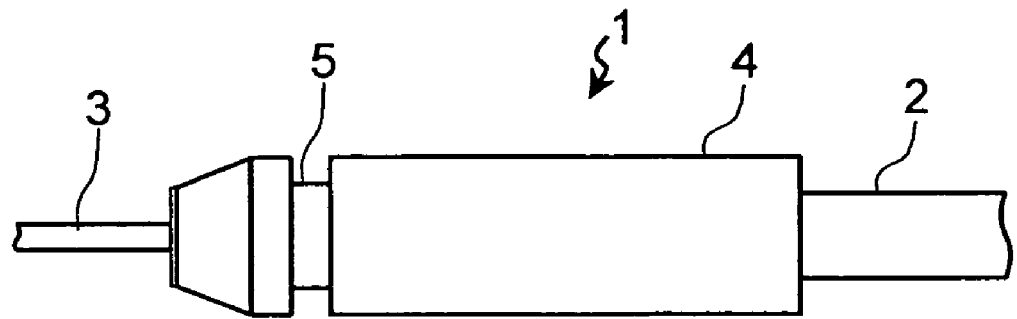
FIG. 1 is a diagram showing a cable to be applied to a cable mounting mechanism according to a first embodiment.
Figure 2:
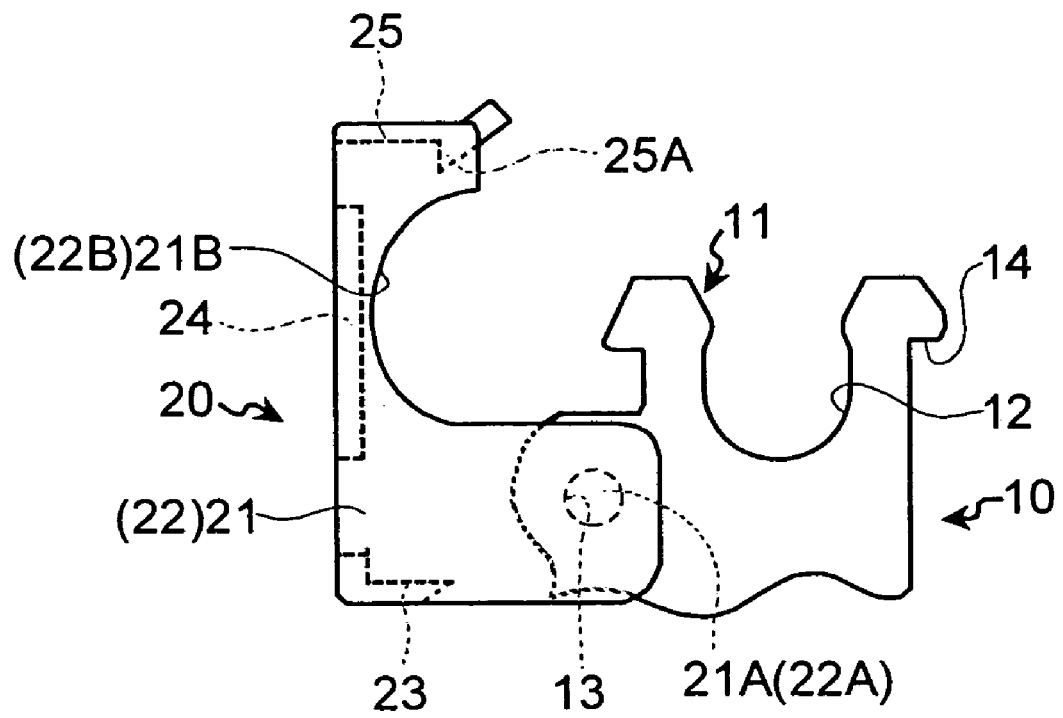
FIG. 2 is a front view showing a state of the cable mounting mechanism according to the first embodiment before the cable is mounted.
Figure 3:
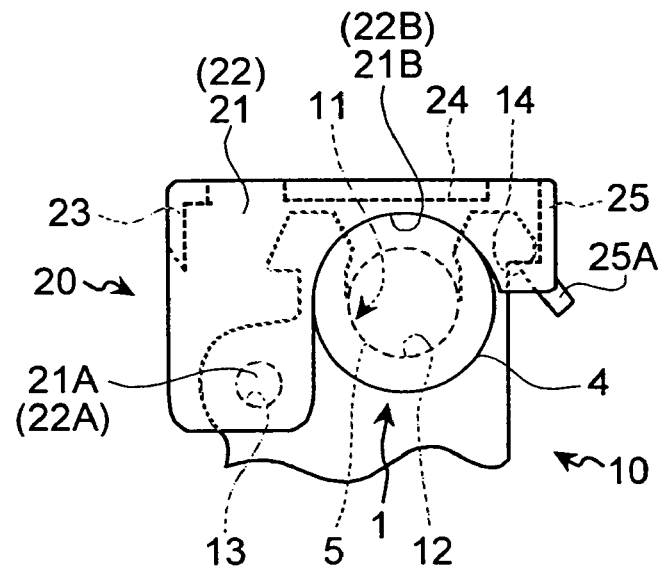
FIG. 3 is a front view showing a state of the cable mounting mechanism shown in FIG. 2 after the cable is mounted.
Figure 4:
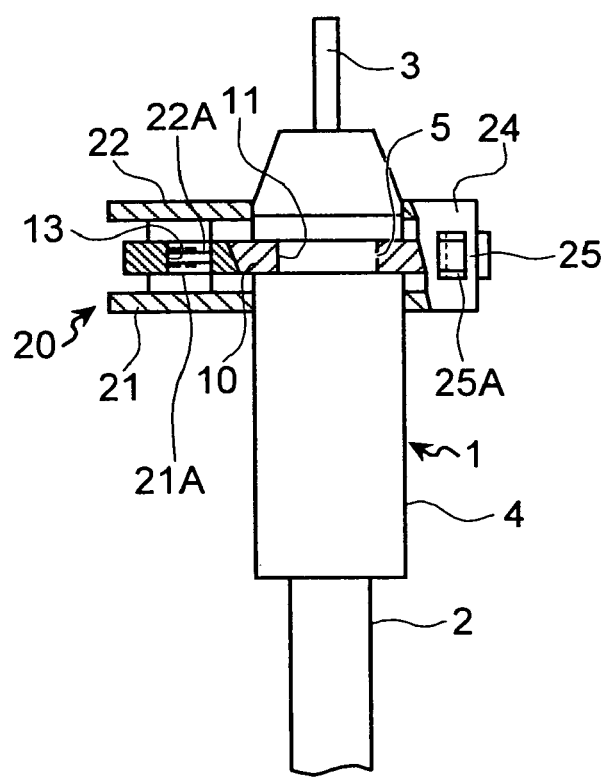
FIG. 4 is a plan view of the cable mounting mechanism shown in FIG. 3.

First, a cable mounting mechanism according to a first embodiment is described. FIG. 1 is a diagram showing a cable to be applied to the cable mounting mechanism according to the first embodiment. FIG. 2 is a front view showing a state of the cable mounting mechanism according to the first embodiment before the cable is mounted. FIG. 3 is a front view showing a state of the cable mounting mechanism shown in FIG. 2 after the cable is mounted. FIG. 4 is a plan view of the cable mounting mechanism shown in FIG. 3.

The cable mounting mechanism according to the first embodiment is a structure for mounting a cable 1 on a bracket 10 of a door-lock device or the like, and includes the cable 1, the bracket 10, and a clip 20.

As shown in FIG. 1, the cable 1 includes an outer tube 2, an inner wire 3 movably passing through the outer tube 2, and an outer end 4 that serves as a mounting portion of the cable 1. Around the perimeter of the outer end 4 of the cable 1, a perimeter groove 5 having a width slightly wider than the plate thickness of the bracket 10 is formed.

The bracket 10 is made of a metal plate and, normally, is bent to form a portion on which the cable 1 is mounted. As shown in FIG. 2, the bracket 10 includes an approximately-U-shaped opening 11 with its top being open and its bottom 12 being shaped like a semicircle having an inner diameter approximately equal to the outer diameter of the perimeter groove 5 so as to be engaged with the perimeter groove 5 of the cable 1. On the left side of the opening 11, an insertion hole 13 in which the clip 20 is inserted is formed. On the right side of the opening 11, an engaging portion 14 is formed to be engaged with the clip 20.

The clip 20 includes a front surface 21, a rear surface 22, a left-side surface 23, an upper surface 24, and a right-side surface 25, all of which are integrally molded with synthetic resin, such as polyacetal. The front surface 21 and the rear surface 22 each have an approximately L shape, and are connected to each other by the left-side surface 23, the upper surface 24, and the right-side surface 25.

Also, the front surface 21 and the rear surface 22 have inner walls with shafts 21A and 22A, respectively, each formed at the lower left of the relevant inner wall so as to be mounted on the bracket 10. With the front surface 21 and the rear surface 22 being bent outward, the shafts 21A and 22A are rotatably inserted in the insertion hole 13 from the front and rear sides, respectively, of the bracket 10 so that the front surface 21 and the rear surface 22 are opposed to each other over the bracket 10, thereby rotatably supporting the clip 20.

Also, the front surface 21 and the rear surface 22 are formed with semicircle portions 21B and 22B, respectively, each having an inner diameter approximately equal to the outer diameter of the outer end 4 of the cable 1. An end of each of these semicircle portions 21B and 22B abuts on the outer surface of the outer end 4 of the cable 1 when the cable 1 is inserted, thereby preventing the cable 1 from being moved in a perimeter direction (upward).

The right-side surface 25 has the inner wall formed with a hook-like nail 25A having its width gradually increased from its tip to bottom. When the cable 1 is inserted, this nail 25A is engaged with the engaging portion 14 of the bracket 10 so as to prevent the clip 20 from being rotated. When the cable 1 is removed, the nail 25A is bent counterclockwise so as to allow the clip 20 to be rotated.

Note that the cable mounting mechanism according to the first embodiment is applied mainly to vehicles, and can be applied to a cable mounting mechanism for transferring a low-load operation of the sill knob or the like and a cable mounting mechanism for transferring a high-load operation of the outside handle, the inside handle, or the like.

According to the cable mounting mechanism of the first embodiment, the movement of the cable 1 in its extending direction is prevented by, as shown in FIG. 4, both sidewalls of the perimeter groove 5 of the cable 1 and the perimeter of the opening of the bracket 10. Also, the movement of the cable 1 in its perimeter direction is prevented by, as shown in FIG. 3, the opening 11 of the bracket 10 and the clip 20. Furthermore, as shown in FIG. 2, when the engagement between the engaging portion 14 of the bracket 10 and the nail 25A of the clip 20 is released so as to allow the clip 20 to be rotated, the cable 1 can be easily removed. Still further, the perimeter groove 5 of the cable 1 is prevented from being scratched when the cable 1 is removed. Therefore, even when the cable 1 is removed for replacement of the door-lock device or the like, the cable 1 and the clip 20 do not have to be replaced by new ones. Still further, the shafts 21A and 22A of the clip 20 are rotatably inserted in the insertion hole 13 of the bracket 10, thereby preventing the clip 20 from falling off from the bracket 10 and being lost.

Figure 5:
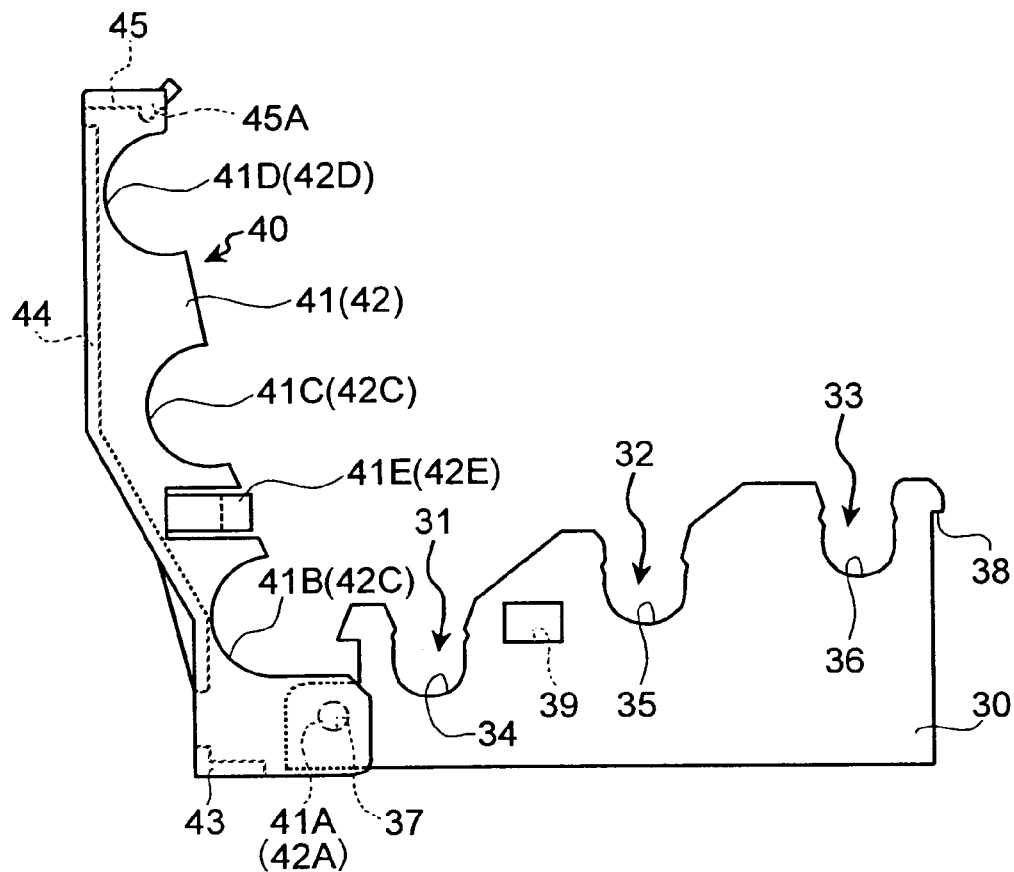
FIG. 5 is a front view showing a state of a cable mounting mechanism according to a second embodiment before the cable is mounted.
Figure 6:
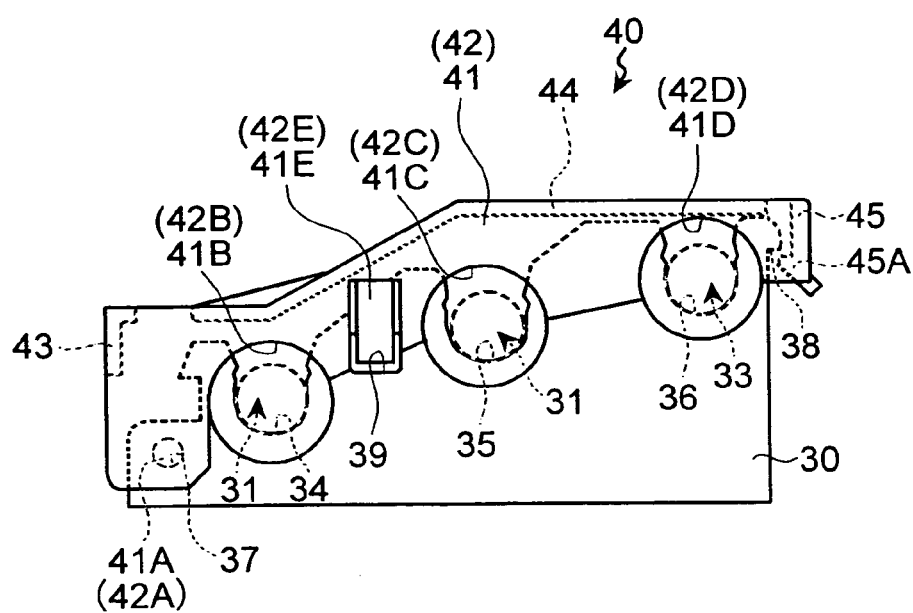
FIG. 6 is a front view showing a state of the cable mounting mechanism shown in FIG. 5 after the cable is mounted.
Figure 7:
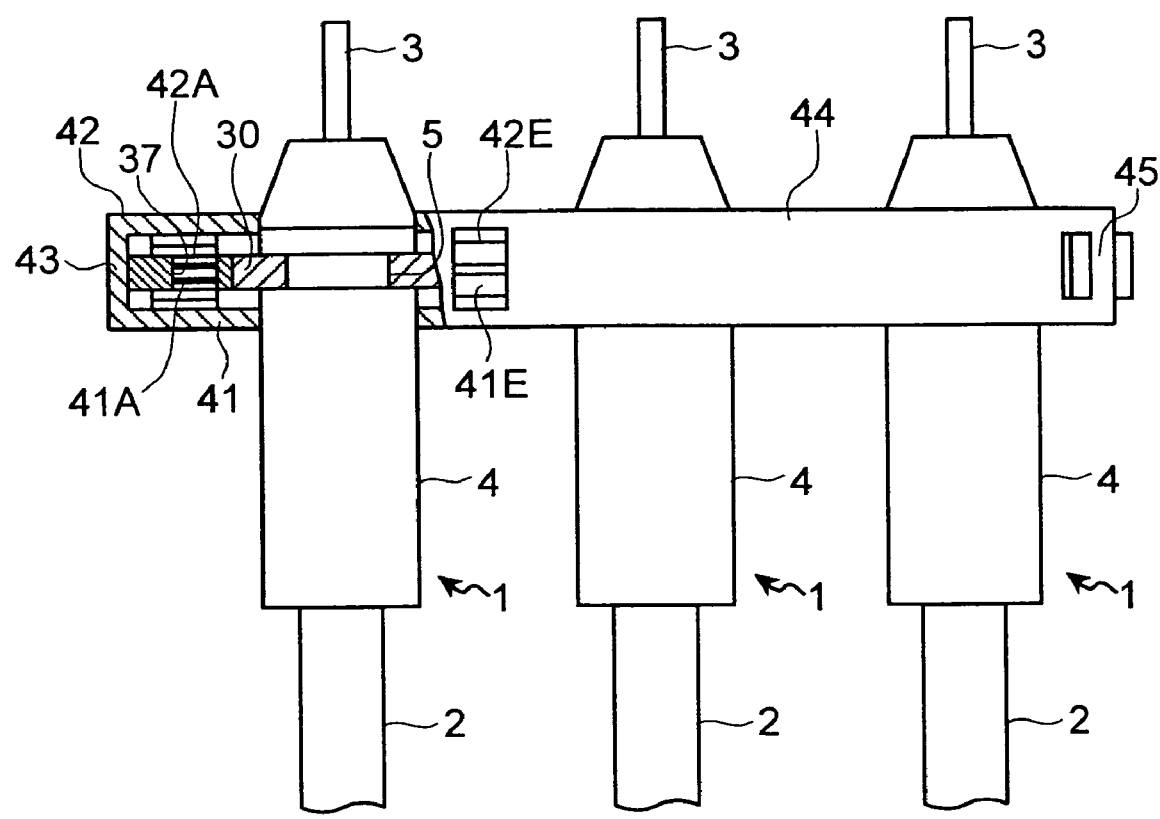
FIG. 7 is a plan view of the cable mounting mechanism shown in FIG. 6.

FIG. 5 is a front view showing a state of the cable mounting mechanism according to a second embodiment of the present invention before the cable is mounted. FIG. 6 is a front view showing a state of the cable mounting mechanism shown in FIG. 5 after the cable is mounted. FIG. 7 is a plan view of the cable mounting mechanism shown in FIG. 6.

As with the cable mounting mechanism according to the first embodiment, the cable mounting mechanism according to the second embodiment is a structure for mounting the cable 1 on a bracket 30 of a door-lock device or the like, and includes the cable 1, the bracket 30, and a clip 40. In the cable mounting mechanism according to the second embodiment, the cable 1 to be mounted is not different from the cable 1 to be applied to the cable mounting mechanism according to the first embodiment, and therefore the components of the cable 1 in the second embodiment are provided with the same reference numerals and are not described herein.

In the cable mounting mechanism according to the second embodiment, three cables 1 are mounted on the bracket 30 with one clip 40. The bracket 30 is made of a metal plate and, normally, is bent to form a portion on which three cables 1 are mounted. As shown in FIG. 5, the bracket 30 is formed with three stair-like openings 31, 32, and 33. As with the bracket 10 according to the first embodiment, these openings 31, 32, and 33 each have its top being open, and their bottoms 34, 35, and 36 are each shaped like a semicircle having an inner diameter approximately equal to the outer diameter of the perimeter groove 5 so as to be fitted in the perimeter groove 5 of the cable 1. On the left side of the opening 31, an insertion hole 37 in which the clip 40 is inserted is formed. On the right side of the opening 33, an engaging portion 38 is formed to be engaged with the clip 40. Furthermore, between the left opening 31 and the center opening 32, a rectangular engaging portion 39 is formed to be engaged with the clip 40.

The clip 40 includes a front surface 41, a rear surface 42, a left-side surface 43, an upper surface 44, and a right-side surface 45, all of which are integrally molded with synthetic resin, such as polyacetal. The front surface 41 and the rear surface 42 are connected to each other by the left-side surface 43, the upper surface 44, and the right-side surface 45.

Also, the front surface 41 and the rear surface 42 have inner walls with shafts 41A and 42A, respectively, each formed at the lower left of the relevant inner wall so as to be mounted on the bracket 30. With the front surface 41 and the rear surface 42 being bent outward, the shafts 41A and 42A are rotatably inserted in the insertion hole 37 from the front and rear sides, respectively, of the bracket 30 so that the front surface 41 and the rear surface 42 are opposed to each other over the bracket 30, thereby rotatably supporting the clip 40.

Also, the front surface 41 and the rear surface 42 are formed with semicircle portions 41B, 42B, 41C, 42C, 41D, and 42D each having an inner diameter approximately equal to the outer diameter of the outer end 4 of the cable 1. An end of each of these semicircle portions 41B, 42B, 41C, 42C, 41D, and 42D abuts on the outer shape of the outer end 4 of the cable 1 when the cable 1 is inserted, thereby preventing the cable 1 from moving in an perimeter direction (upward).

The right-side surface 45 has an inner wall formed with a hook-like nail 45A having its width gradually increased from its tip to bottom. When the cable 1 is inserted, this nail 45A is engaged with the engaging portion 38 of the bracket 30 so as to prevent the clip 40 from being rotated. When the cable 1 is removed, the nail 45A is bent counterclockwise so as to allow the clip 40 to be rotated.

The front surface 41 and the rear surface 42 have inner walls formed with hook-like nails 41E and 42E, respectively, each having its width gradually increased from its tip to bottom. When the cable 1 is inserted, these nails 41E and 42E are also engaged with the engaging portion 39 of the bracket 30 so as to prevent the clip 40 from being rotated. When the cable 1 is removed, the nails 41E and 42E are bent outward so as to allow the clip 40 to be rotated. Here, in addition to the nail 45A formed on the inner wall of the right-side surface 45, the nails 41E and 42E are formed on the inner walls of the front surface 41 and the rear surface 42. The reason for this is as follows. In the cable mounting mechanism according to the second embodiment, three cables 1 are mounted, and therefore a distance from the insertion hole 37 to the engaging portion 38 of the bracket 30 is long, which makes the clip 40 more prone to fall off than the clip in the cable mounting mechanism according to the first embodiment.

Note that the cable mounting mechanism according to the second embodiment is applied mainly to vehicles, and can be applied to a cable mounting mechanism for transferring a low-load operation of the sill knob or the like and a cable mounting mechanism for transferring a high-load operation of the outside handle, the inside handle, or the like.

According to the cable mounting mechanism of the second embodiment, the movement of the cable 1 in its extending direction is prevented by, as shown in FIG. 7, both sidewalls of the perimeter groove 5 of the cable 1 and the perimeter of the opening of the bracket 30. Also, the movement of the cable 1 in its perimeter direction is prevented by, as shown in FIG. 6, the openings 31, 32, and 33 of the bracket 30 and the clip 40. Furthermore, as shown in FIG. 5, when the engagement between the engaging portion 38 and the nail 45A and the engagement between the engaging hole 39 and the nails 41E and 42E are released so as to allow the clip 40 to be rotated, the cable 1 can be easily removed. Still further, the outer shape of the perimeter groove 5 of the cable 1 is prevented from being scratched when the cable 1 is removed. Therefore, even when the cable 1 is removed for replacement of the door-lock device or the like, the cable 1 and the clip 40 do not have to be replaced by new ones. Still further, the shafts 41A and 42A of the clip 40 are rotatably inserted in the insertion hole 37 of the bracket 30, thereby preventing the clip 40 from failing off from the bracket 30 and being lost.

Still further, the movement of three cables 1 in the perimeter direction can be prevented by one clip 40. Therefore, when the cables 1 are disposed in parallel, these cables can be mounted at low cost.

Figure 8:
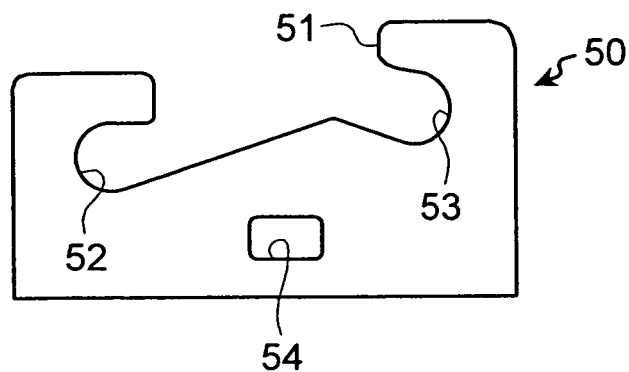
FIG. 8 is a front view of a bracket to be applied to a cable mounting mechanism according to a third embodiment.
Figure 9:
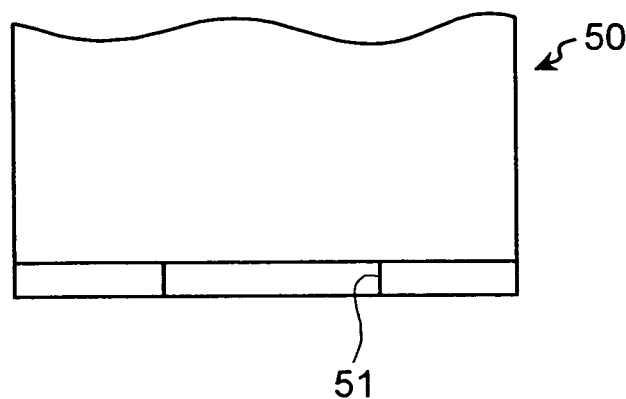
FIG. 9 is a plan view showing a bracket shown in FIG. 8.
Figure 10:
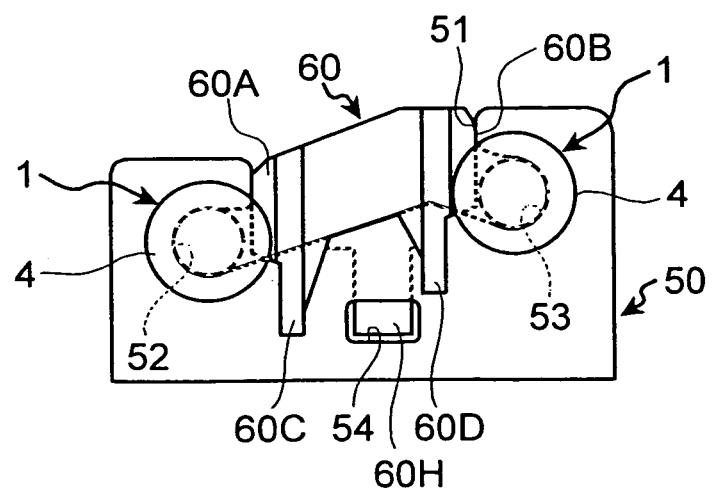
FIG. 10 is a front view of the cable mounting mechanism according to the third embodiment.
Figure 11:
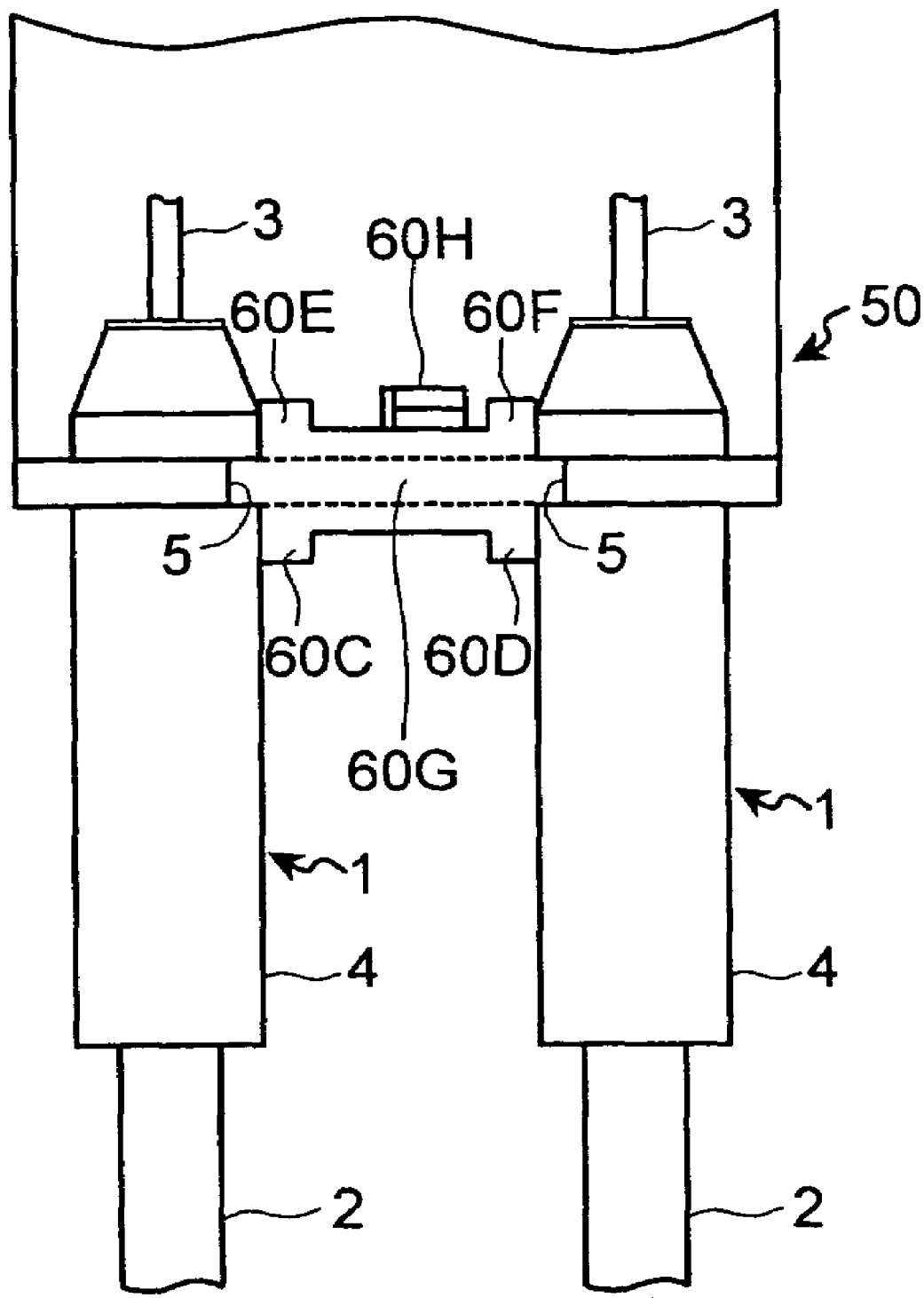
FIG. 11 is a plan view of the cable mounting mechanism shown in FIG. 10.

FIG. 8 is a front view of a bracket to be applied to the cable mounting mechanism according to a third embodiment of the present invention. FIG. 9 is a plan view showing a bracket shown in FIG. 8. FIG. 10 is a front view of the cable mounting mechanism according to the third embodiment. FIG. 11 is a plan view of the cable mounting mechanism shown in FIG. 10.

As with the cable mounting mechanism according to the first embodiment, the cable mounting mechanism according to the third embodiment is a structure for mounting the cable 1 on a bracket 50 of a door-lock device or the like, and includes the cable 1, the bracket 50, and a clip 60. In the cable mounting mechanism according to the third embodiment, the cable 1 to be mounted is not different from the cable 1 to be applied to the cable mounting mechanism according to the first embodiment, and therefore the components of the cable 1 in the third embodiment are provided with the same reference numerals and are not described herein.

In the cable mounting mechanism according to the third embodiment, two cables 1 are mounted on the bracket 50 with one clip 60. The bracket 50 is made of a metal plate and, normally, is bent to form a portion on which two cables 1 are mounted. As shown in FIG. 8, the bracket 50 is formed with an opening 51 that is formed at its right and left edges with U-shaped perimeter grooves 52 and 53, respectively, in which the cables 1 are fitted. Each of these perimeter grooves 52 and 53 is a portion in which the perimeter groove 5 of the cable 1 is fitted, and is shaped like a semicircle having an inner diameter approximately equal to the outer diameter of the perimeter groove 5. Also, approximately at a lower-center of the opening 51, a rectangular engaging hole 54 is formed for engaging the clip 60.

The clip 60 is integrally molded with synthetic resin, such as polyacetal, and is engaged with the opening 51 of the bracket 50 so as to prevent the cable 1 from being moved in the perimeter direction.

As shown in FIGS. 10 and 11, the clip 60 has a width approximately equal to the width of the opening 51 of the bracket 50. The clip 60 has a left-side edge 60A and a right-side edge 60B each having a thickness equal to the thickness of the bracket 50 so as to be fitted in the perimeter groove 5 of the cable 1 mounted on the bracket 50. Also, ribs 60C, 60D, 60E, and 60F are protruded from the front-left side, the front-right side, the rear-left side, and the rear-right side, respectively of the clip 60. These ribs 60C, 60D, 60E, and 60F can abut on the outer surface of the outer end 4 of the cable 1 mounted on the bracket 50.

On the lower edge of the clip 60, a slit 60G having a width approximately equal to the thickness of the bracket 50 is formed. When the clip 60 is inserted in the bracket 50, the bracket 50 is fitted in the slit 60G so that the clip 60 pinches the front surface and the rear surface of the bracket 50.

Approximately at the center of the rear surface of the clip 60, a hook-like nail 60H having its width gradually increased from its tip to bottom is formed. When the clip 60 is inserted in the bracket 50, this nail 60H is engaged with the engaging hole 54 of the bracket 50. Therefore, the clip 60 does not fall off from the bracket 50.

Note that the cable mounting mechanism according to the third embodiment is applied mainly to vehicles, and can be applied to a cable mounting mechanism for transferring a low-load operation of the sill knob or the like and a cable mounting mechanism for transferring a high-load operation of the outside handle, the inside handle, or the like.

According to the cable mounting mechanism of the third embodiment, the movement of the cable 1 in its extending direction is prevented by, as shown in FIG. 10, both sidewalls of the perimeter groove 5 of the cable 1 and the perimeters of the perimeter grooves 52 and 53 of the bracket 50. Also, the movement of the cable 1 in its perimeter direction is prevented by the perimeters of the perimeter grooves 52 and 53 of the bracket 50 and the clip 60. When the engagement between the engaging hole 54 and the nail 60H is released so as to allow the clip 40 to be removed, the cable 1 can be easily removed. Still further, the outer shape of the perimeter groove 5 of the cable 1 is prevented from being scratched when the cable 1 is removed. Therefore, even when the cable 1 is removed for replacement of the door-lock device or the like, the cable 1 and the clip 60 do not have to be replaced by new ones.

Still further, the movement of two cables 1 in the perimeter direction can be prevented by one clip 60. Therefore, when the cables 1 are disposed in parallel, these cables can be mounted at low cost.

Figure 12:
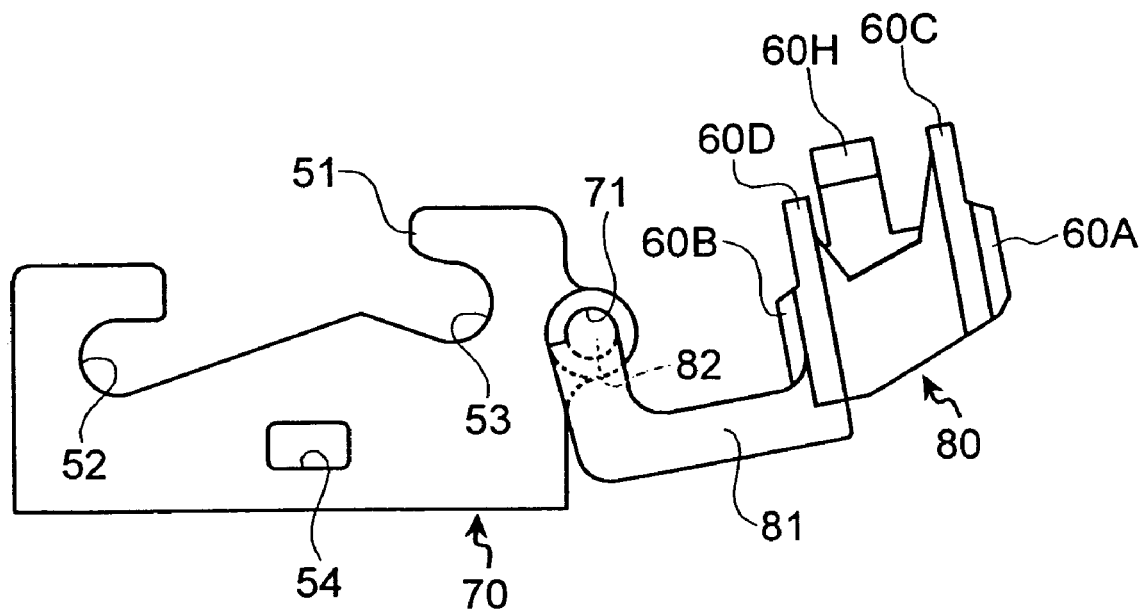
FIG. 12 is a front view showing a state of a cable mounting mechanism according to a fourth embodiment before the cable is mounted.
Figure 13:
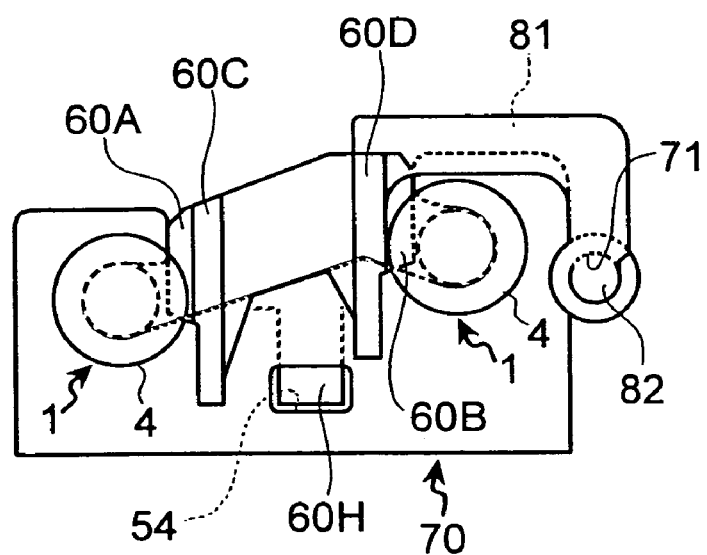
FIG. 13 is a front view showing a state of the cable mounting mechanism shown in FIG. 12 after the cable is mounted.

FIG. 12 is a front view showing a state of the cable mounting mechanism according to a fourth embodiment of the present invention before the cable is mounted. FIG. 13 is a front view showing a state of the cable mounting mechanism shown in FIG. 12 after the cable is mounted.

The cable mounting mechanism according to the fourth embodiment is a structure for mounting the cable 1 on a bracket 70 of a door-lock device or the like, and includes the cable 1, the bracket 70, and a clip 80. In the cable mounting mechanism according to the fourth embodiment, the cable 1 to be mounted is not different from the cable 1 to be applied to the cable mounting mechanism according to the first embodiment, and therefore the components of the cable 1 in the fourth embodiment are provided with the same reference numerals and are not described herein. Also, the cable mounting mechanism according to the fourth embodiment is different from the cable mounting mechanism according to the third embodiment only in that an arm 81 that movably supports the bracket is provided to the clip 80 so as to prevent the clip 80 from falling off when removed. Therefore, components identical in structure to those in the cable mounting mechanism according to the third embodiment are provided with the same reference numerals and are not described herein.

The bracket 70 is formed on its right with an insertion hole 71 for mounting the clip 80. With a shaft 82 being inserted in this insertion hole 71, the arm 81 extending from the clip 80 is mounted.

Therefore, even when the clip 80 is removed at the time of removing the cable 1, the clip 80 does not fall off from the bracket 70, thereby preventing the clip 80 from being lost.

Figure 14:
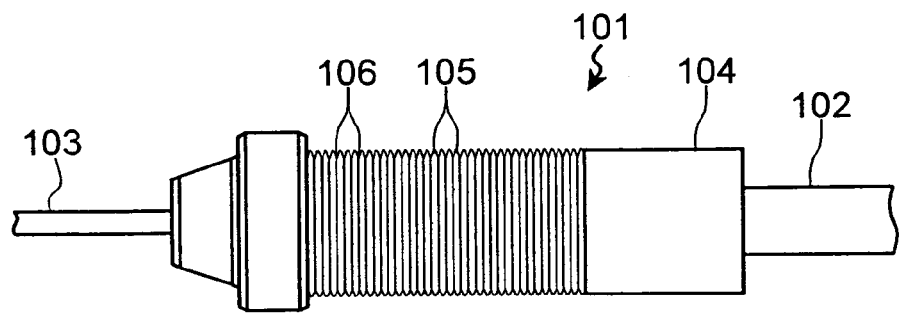
FIG. 14 is a diagram showing a cable to be applied to a cable mounting mechanism according to a fifth embodiment.
Figure 15:
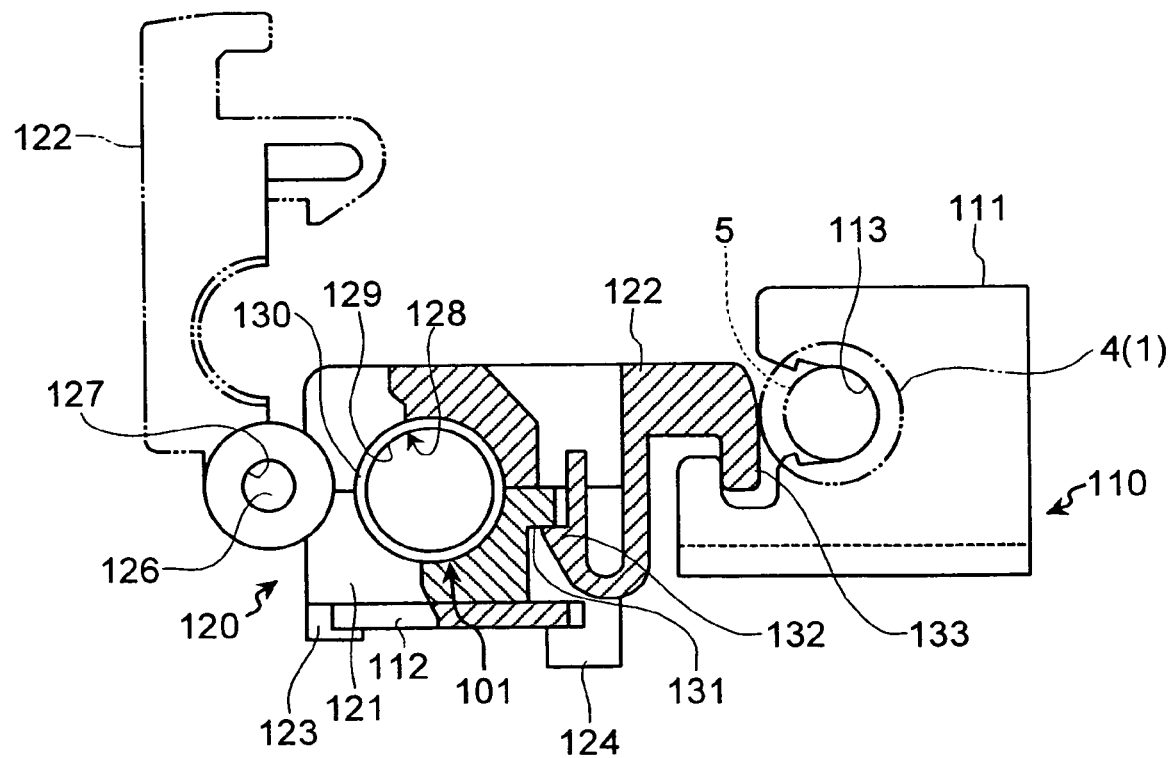
FIG. 15 is a front view of the cable mounting mechanism according to the fifth embodiment.
Figure 16:
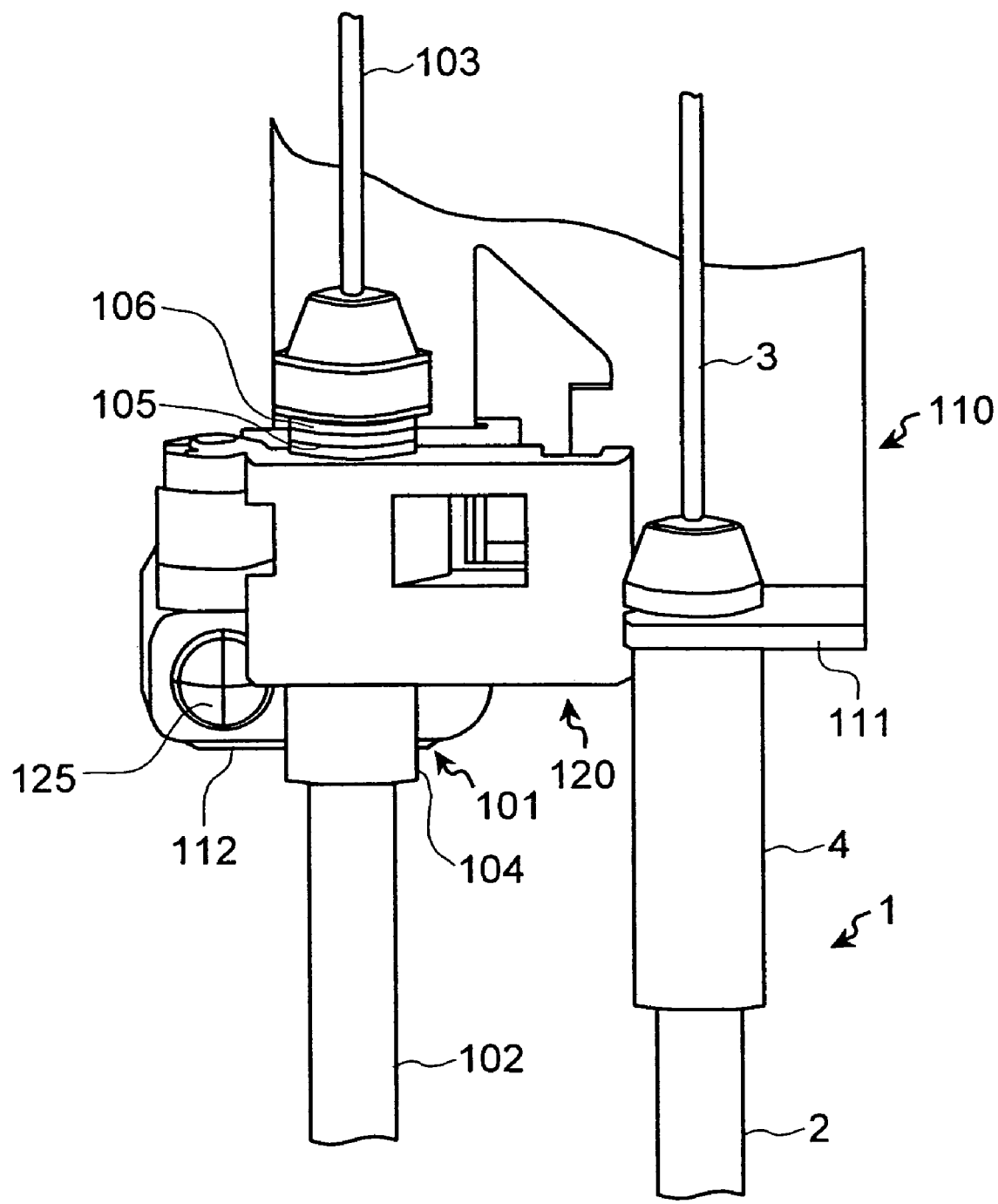
FIG. 16 is a plan view of the cable mounting mechanism shown in FIG. 15.

FIG. 14 is a diagram showing a cable to be applied to the cable mounting mechanism according to a fifth embodiment of the present invention. FIG. 15 is a front view of the cable mounting mechanism according to the fifth embodiment. FIG. 16 is a plan view of the cable mounting mechanism shown in FIG. 15.

The cable mounting mechanism according to the fifth embodiment is a structure for mounting cables 1 and 101 on a bracket 110, and includes the cables 1 and 101, the bracket 110, and a clip 120.

In the cable mounting mechanism according to the fifth embodiment, two types of cables 1 and 101 are mounted. That is, one is for transferring a high-load operation of the outside handle, the inside handle, or the like, and the other is for transferring a low-load operation of the sill knob or the like. In the cable mounting mechanism according to the fifth embodiment, the cable 1 described in the first embodiment is applied as a cable for transferring a high-load operation, and the cable 101 shown in FIG. 14 is applied as a cable for transferring a low-load operation.

The cable 101 for transferring a low-load operation includes, as shown in FIG. 14, an outer tube 102, an inner wire 103 movably passing through the outer tube 102, and an outer end 104 that serves as a mounting portion of the cable 101. Around the perimeter of the outer end 104 of the cable 1, crests 105 and troughs 106 are alternately formed.

The bracket 110 made of a metal plate includes a standing portion 111, and a flat plate portion 112 adjacent to the standing portion 111. The standing portion 111 is formed by, normally, bending the metal plate, and is also formed with an approximately-U-shaped opening 113 that opens its left. This opening 113 has an inner diameter approximately equal to the outer diameter of the perimeter groove 5 of the cable 1 for transferring a high-load operation so as to allow the perimeter groove 5 to be fitted in the opening 113.

The clip 120 has a fixed portion 121 and a rotating portion 122. The fixed portion 121 is formed with mounting nails 123 and 124 for the bracket. The mounting nails 123 and 124 grips the flat plate portion 112 of the bracket 110, and then the clip 120 is mounted on the bracket 120 with a screw 125.

The fixed portion 121 is formed at its left with a shaft 126. The rotating portion 122 is formed with an insertion hole 127 in which the shaft 126 is fitted and a front edge portion 133 protruding to its right. With this shaft 126 being inserted in the insertion hole 127, the rotating portion 122 is movably mounted on the fixed portion 121.

The fixed portion 121 and the rotating portion 122 form a facing surface on which a gripping portion 128 is formed for gripping the outer end 104 of the cable 101. The gripping portion 128 is formed with crests 129 and troughs 130 so as to be engaged with the crests 105 and the troughs 106 formed on the outer end 104 of the cable 101.

The fixed portion 121 is formed at its right with an engaging portion 131. The rotating portion 122 is formed with a hook-like nail 132 for engaging with this engaging portion 131. Therefore, after the cable 101 is pinched between the fixed portion 121 and the rotating portion 122, the nail 132 is engaged with the engaging portion 131, thereby allowing the cable 101 to be mounted on the clip 120. At this time, the front edge portion 133 of the clip 120 prevents the cable 1 from being moved in the perimeter direction.

Note that the cable mounting mechanism according to the fifth embodiment is applied mainly to vehicles. With a single cable mounting mechanism, it is possible to mount the cable 1 for transferring a high-load operation of an outside handle, an inside handle, or the like and the cable 101 for transferring a low-load operation of the sill knob or the like.

According to the cable mounting mechanism of the fifth embodiment, the movement of the cable 1 in its extending direction is prevented by, as shown in FIG. 15, both sidewalls of the perimeter groove 5 of the cable 1 and the perimeter of the opening 113 of the bracket 110. The movement of the cable 101 in its extending direction is prevented by the engagement between the crests 105 and the troughs 106 formed on the cable 101 and the crests 129 and the troughs 130 formed on the fixed portion 121 and the rotating portion 122 of the clip portion 120.

Also, the movement of the cable 1 in its perimeter direction is prevented by the opening 113 of the bracket 110 and the front edge portion 133 of the clip 120. The movement of the cable 101 in its perimeter direction is prevented by the engaging portion 131 formed on the fixed portion 121 of the clip 120 and the nail 132 formed on the rotating portion 122.

When the engagement between the engaging portion 131 formed on the fixed portion 121 of the clip 120 and the nail 132 formed on the rotating portion 122 is released so as to allow the rotating portion 122 to be rotated, the cables 1 and 101 can be easily removed. Still further, the perimeters of the cables 1 and 101 are prevented from being scratched when any one or both of the cables 1 and 101 are removed. Therefore, even when any one or both of the cables 1 and 101 are removed for replacement of the door-lock device or the like, the removed one or both of the cables 1 and 101, and the clip 120 do not have to be replaced by new ones. Furthermore, the movement of two cables 1 and 101 in the perimeter direction can be prevented by one clip. Therefore, when the cable 1 and 101 are disposed in parallel, these cables can be mounted at a cost lower than the cost incurred in the cable mounting mechanism according to the first embodiment.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A cable mounting mechanism comprising:
   a bracket having an opening that is defined by a perimeter and an insertion hole;
   a cable having a perimeter groove with sidewalls that is mounted in the opening in such a manner that said perimeter of the bracket is pinched between said sidewalls of the perimeter groove,
   a clip that is rotatably mounted for movement between an open position for receiving said cable and a closed position for preventing the mounted cable from being moved in a perimeter direction; and
   a shaft insertable into said insertion hole for facilitating rotation of said clip.

2. The cable mounting mechanism according to claim 1, wherein a nail that is engaged with the bracket is formed on the clip.

3. The cable mounting mechanism according to claim 1, wherein
   the clip is mounted on the bracket, and
   the clip is rotatably supported by a pair of shafts so as to switch between a preventing status in which movement of the cable is prevented in both the axial and the perimeter direction and an allowing status in which the movement of the cable is allowed in the perimeter direction.

4. A cable mounting mechanism comprising:
   a bracket with an opening for receiving a first cable;
   a clip mountable on said bracket and operative to close said opening and secure said first cable, said clip comprising a fixed portion defined by a first gripping portion and an insertion hole and a rotating portion rotatably mounted on the fixed portion and having a second gripping portion, said first and second gripping portion being alignable to grip a second cable; and
   a shaft coupled to said rotating portion and being inserted in said insertion holes
   whereby the rotating portion is rotatably mounted for movement between an open position for receiving said first and second cables and a closed position, wherein the fixed portion and the rotating portion cooperatively grip the second cable.

\* \* \* \* \*